(12) United States Patent
Smedberg et al.

(10) Patent No.: US 8,722,763 B2
(45) Date of Patent: May 13, 2014

(54) MASTERBATCH AND PROCESS FOR PREPARING A POLYMER COMPOSITION

(75) Inventors: Annika Smedberg, Myggenas (SE); Philippe Ravera, New Jersey, NJ (US); Ulf Nilsson, Stenungsund (SE)

(73) Assignee: Borealis AG, Vienna (AT)

( * ) Notice: Subject to any disclaimer, the term of this patent is extended or adjusted under 35 U.S.C. 154(b) by 171 days.

(21) Appl. No.: 13/141,672

(22) PCT Filed: Dec. 21, 2009

(86) PCT No.: PCT/EP2009/009192
§ 371 (c)(1),
(2), (4) Date: Aug. 3, 2011

(87) PCT Pub. No.: WO2010/072396
PCT Pub. Date: Jul. 1, 2010

(65) Prior Publication Data
US 2011/0284260 A1    Nov. 24, 2011

(30) Foreign Application Priority Data
Dec. 22, 2008 (EP) .................................... 08172600

(51) Int. Cl.
*H02G 15/00* (2006.01)

(52) U.S. Cl.
USPC ........... 523/173; 523/351; 524/219; 524/306; 524/308; 524/309; 524/310; 524/312; 524/318; 524/377; 524/381

(58) Field of Classification Search
USPC .......... 523/173, 351; 524/219, 306, 308, 309, 524/310, 312, 318, 377, 381
See application file for complete search history.

(56) References Cited

U.S. PATENT DOCUMENTS

| 4,855,360 A | 8/1989 | Duchesne |
| 7,968,623 B2 * | 6/2011 | Easter ........................... 523/173 |

FOREIGN PATENT DOCUMENTS

| EP | 0 009 268 | 4/1980 |
| WO | WO 99/40589 | 8/1999 |
| WO | WO 00/36612 | 6/2000 |
| WO | WO 02/052582 | 7/2002 |
| WO | WO 2006/014852 | 2/2006 |

OTHER PUBLICATIONS

Rule J.D., et al., "Polymerizations Initiated by Diradicals from Cycloaromatization Reations" Macromolecules, ACS, Washington, DC, US, vol. 38, No. 17, dated Aug. 23, 2005, pp. 7266-7273.
International Search Report and Written Opinion, International Application No. PCT/EP2009/009192, dated Apr. 27, 2010.

* cited by examiner

*Primary Examiner* — Edward Cain
(74) *Attorney, Agent, or Firm* — Knobbe, Martens, Olson & Bear, LLP

(57) ABSTRACT

The present invention relates to a process for preparing a polymer composition by using a masterbatch, as well as a process, wherein said polymer composition is used for preparing an article, preferably a cable. Also a masterbatch, a polymer composition comprising the masterbatch, and an article, preferably a cable, comprising the polymer composition are provided.

16 Claims, No Drawings

MASTERBATCH AND PROCESS FOR PREPARING A POLYMER COMPOSITION

FIELD OF THE INVENTION

The present invention relates to a process for preparing polymer composition by blending a masterbatch and a polyolefin and the use of said polymer composition for preparing an article. A masterbatch and a polymer composition which are preferable embodiments of the above processes are also provided independently. Furthermore, the invention provides an article, preferably a cable, comprising said polymer composition.

BACKGROUND ART

A typical electric power cable generally comprises a conductor that is surrounded by several layers of polymeric materials including an inner semiconducting layer, followed by an insulating layer, and then an outer semiconducting layer. These layers can be crosslinked as well known in the field. To these layers, one or more further auxiliary layer(s) may be added, such as a screen and/or a jacketing layer(s) as the outer layer. The layers of the cable are based on different types of polymers. E.g. low density polyethylene, crosslinked by adding peroxide compounds, is a typical cable insulation material.

Polyolefins, particularly polyethylene is generally used without filler as an electrical insulation material as it has good dielectric properties, especially high breakdown strength. Such insulated cables have, however, a drawback that they suffer from shortened service life when installed and operated in an environment where the polymer is exposed to water, e.g. under ground or at locations of high humidity. The reason is that polyolefins tend to form bush-shaped defects, so-called water trees, when exposed to water under the action of electrical fields. Such defects may be due to inhomogeneities, for instance microcavities and impurities, such as contaminants, occurring in the layer material and they can lead to lower breakdown strength and possibly electric failure when in use.

The appearance of water tree structures are manifold. In principle, it is possible to differentiate between two types:

"Vented trees" which have their starting point on the surface of the semiconductive layer(s) and "Bow-tie trees" which are initiated within the insulation material often starting from a defect or a contaminant.

Water treeing is a phenomenon that has been studied carefully since the 1970's. Many solutions have been proposed for increasing the resistance of insulating materials to degradation by water-treeing. One solution involves the addition of polyethylene glycol, as water-tree growth inhibitor to a low density polyethylene such as described in U.S. Pat. No. 4,305,849 and U.S. Pat. No. 4,812,505. Furthermore, the invention WO 99/31675 discloses a combination of specific glycerol fatty acid esters and polyethylene glycols as additives to polyethylene for improving water-tree resistance. Another solution is presented in WO 85/05216 which describes copolymer blends.

Further, EP 1 695 992 describes at least one ether and/or ester group containing additive that is combined with an unsaturated polyolefin in order to provide a polyolefin composition with enhanced crosslinking properties and improved water-tree resistance.

In the prior art, polymer (compound) producers have conventionally added these water tree retardant additives as such, i.e. without any carrier medium, to a polymer after the polymerisation thereof. Optionally further additive(s), such as antioxidant(s), are added as well. The addition is typically effected in a compounding step, wherein the polymer material obtained from the polymerisation step is meltmixed and then pelletised by the polymer producers, before supply to article producers who produce articles comprising the polymer. Such compounding step enables a homogenous distribution of the additives in the polyolefin.

OBJECTS OF THE INVENTION

It is object of the present invention to provide a further process for preparing a polymer composition with sufficient homogeneity for enabling to produce articles with good properties to an intended end application. Accordingly also a preparation process of articles, preferably cables, comprising said polymer composition, is provided.

As a further object of the invention a masterbatch, the preparation thereof and polymer composition that are highly feasible for the above processes are also provided independently. Furthermore, the invention provides an article, preferably cable, comprising said polymer composition.

DESCRIPTION OF THE INVENTION

Accordingly, the object of the invention is solved by a process for preparing a polymer composition which process comprises at least the steps of:

a) providing a masterbatch (MB) which comprises at least one water tree retardant (WTR) additive and a carrier polymer, and b) blending the masterbatch obtained from step a) with at least one polyolefin (A) to obtain said polymer composition of the invention.

The polymer composition of the invention is referred herein shortly as the polymer composition. Blending and blend is used herein interchangeably with terms mixing and mixture, respectively. Masterbatch is referred herein also as MB and it comprises at least the carrier polymer and WTR additive(s).

Carrier polymer refers to a polymer that supports the dispersion of the at least one water tree retardant additive in the polymer blend. The carrier polymer may comprise one or more polymer component(s), preferably one polymer component, and is preferably a polyolefin as further described below. Furthermore, the MB may comprise one or more carrier polymer(s), preferably one.

Respectively, the polyolefin (A) may comprise one or more polymer component(s), preferably one polymer component. Furthermore, the polymer composition may comprise one or more polyolefin(s) (A), preferably one polyolefin (A).

Moreover, one or more MBs can be used for preparing the polymer composition. The amounts given below in relation to the components of the MB are based on the total amount of the MB. The amounts given below in relation to the components of the polymer composition are based on the total amount of the polymer composition.

In step a) of the process the MB is preferably provided by incorporating one or more WTR additive(s) to the carrier polymer, whereby the total amount of the one or more WTR additive(s) is of more than 0.5 wt %, based on the total amount of the MB.

Moreover, all the needed WTR additive(s) can be provided in step a), whereby these can be provided in one or more MB(s), or, alternatively, part of the needed WTR additive(s) can be added separately e.g. as such during the preparation process of the polymer composition.

Preferably, the preparation process of polymer composition comprises the steps of a) providing a MB, comprising one or more WTR additive(s), wherein the total amount of one or more WTR additive(s) is of less than 50 wt %, preferably of up to 30 wt %, more preferably of from 1.5 to 20 wt %, more preferably of from 2.0 to 15 wt %, and even more preferably of from 3.0 to 15 wt %, based on the total amount (wt %) of the MB, and a carrier polymer in an amount of at least 50 wt %, preferably of at least 70 wt %, more preferably of at least 80 to 98.5 wt %, more preferably of at least 85 to 98.0 wt %, more preferably of from 85 to 97 wt %, based on the total amount of the MB, and b) blending the MB of step a) with at least one polyolefin (A).

Preferably in said process, more preferably in the above preferable embodiment of the process, the at least one WTR additive(s) is an organic compound containing at least one ether and/or ester group, preferably as further descried below.

Preferably in said process, more preferably in the above preferable embodiment of the process, step b) comprises blending up to 20 wt %, preferably of from 2.0 to 15 wt %, of the MB of step a), based on the total amount of the polymer composition, with the polyolefin(s) (A).

The polyolefin(s) (A) form(s) the main polymer component(s) of the polymer composition of the process. The polymer composition may comprise further polymer components, however, preferably consists of polyolefin(s) (A).

More preferably, said process comprises b) blending at least one MB with at least 70 wt %, preferably with at least 80 wt %, more preferably with 85 to 98 wt % of polyolefin(s) (A), based on the total amount of the polymer composition.

Even more preferred preparation process of the polymer composition comprises b) blending one or more, preferably one, MB of step a) in a total amount of one or more MB(s) of up to 20 wt %, preferably of from 2.0 to 15 wt %, optionally together with further component(s), with one or more, preferably one, polyolefin (A) in a total amount of one or more polyolefin(s) of at least 80 wt %, more preferably of from 85 to 98 wt %, based on the total amount of the polymer composition Further preferably, the one or more WTR additive(s) can be incorporated to the carrier polymer in step a) by mixing with the carrier polymer in an elevated temperature, more preferably by meltmixing, and, optionally, the obtained MB can be pelletised before the use in step b).

Meltmixing is a well known blending method, wherein the component(s) of the polymer composition are mixed in an elevated temperature, which is typically carried out in a temperature of at least 15° C. above the melting or softening point of at least the polymer component(s). Meltmixing can be effected in a conventional mixing device and/or extruder, as well known.

The optional pelletising step is a well known term for a method, wherein the polymer composition is further processed to a feasible form for later use e.g. for preparing an article thereof. Pellets are understood herein as a powder, grain or pellet of any size and shape, as well known in the art. Pellets are typically formed by meltmixing the formed polymer composition and then extruding the polymer composition melt via a die in a conventional extrusion equipment, such as single or twin screw extruder. The extrudate coming through the die is finally cut to pellets in a known manner.

In a more preferable embodiment the polymer composition is produced a) by providing the MB in form of pellets and b) by blending said pellets of the MB of step a), optionally together with further component(s), with said at least one polyolefin (A). The pellets of the MB are preferably produced separately and the pelletised MB is then provided for the preparation process of the polymer composition.

In the above embodiment the pellets of MB can be prepared by adding the at least one WTR additive, optionally together with further component(s), to the pellets of the carrier polymer in a temperature which is below the melt temperature of the carrier polymer. This addition method results in MB pellets, wherein the WTR additive(s) are typically impregnated into the pellets of the carrier polymer and/or coated by the WTR additive(s), depending on whether WTR additive(s) was added in liquid or solid state.

However, the above embodiment more preferably comprises: a) providing the MB in form of pellets by meltmixing the at least one WTR additive and the carrier polymer at an elevated temperature which is at least above the melting or softening temperature of the carrier polymer and pelletising the meltmix of the MB; and b) blending the pellets of MB obtained from step a) with at least one polyolefin (A). In this embodiment it is preferred that a) the MB is provided by meltmixing the at least one WTR additive and the carrier polymer and by pelletising the melt mixture of the MB as described above, and b) by blending the obtained pellets of the MB of step a) with at least one polyolefin (A) by meltmixing at an elevated temperature which is at least above the melting or softening temperature of the carrier polymer and polyolefin (A). The meltmixing of step b) can be carried out analogously to the meltmixing described above for the MB.

The obtained polymer composition is preferably used for producing an article. Accordingly, the invention further provides a process for preparing an article comprising the polymer composition of the invention, which process comprises at least the steps of a) providing a masterbatch which comprises at least one water tree retardant additive and a carrier polymer, b) blending the masterbatch obtained from step a) with at least one polyolefin (A) to obtain a polymer composition, and c) producing an article using the polymer composition of step b).

The article in step c) is produced using the well known techniques.

The polymer composition of step a) and b) can be prepared separately before it is used in the article preparation process. If such premade polymer composition is used, then it is preferably provided in the form of pellets to the article production process.

It is more preferable that the polymer composition is produced in connection with the article production process, e.g. in the article production line. In this embodiment it is further preferred that MB of step a) is provided in form of pellets for preparing the polymer composition. Thus the preferred embodiment of the article production process comprises the steps of, a) providing a MB in form of pellets as defined above, which comprise at least one water tree retardant additive and a carrier polymer, b) blending the MB from step a) with at least one polyolefin (A) by meltmixing, to obtain a polymer composition, and c) producing an article using the polymer composition of step b). In this embodiment the melt mixture of the polymer composition obtained from step b) is preferably used in step c) for forming the article, as well known in the field.

The article prepared by the process of the invention may be non-crosslinkable or crosslinkable. If the article is crosslinkable, then the article preparation process comprises a further step d) of crosslinking the article obtained from step c) at crosslinking conditions in a manner well known in the art. In this crosslinking embodiment the step d) is preferably effected in the presence of a crosslinking agent which can be added in any of the steps a), b) and/or c). In case of the embodiment for producing a crosslinkable article the polymer composition is preferably produced in connection with the article production process according to the preferred embodiment as defined above or below.

It has surprisingly been found that the polymer composition of the preparation process of the invention enables to produce an article which has excellent electric breakdown strength after wet ageing which is comparable with electric breakdown strength of conventionally produced articles, wherein the WTR additive(s) have been added as such and not in any carrier medium. The excellent electric breakdown strength indicates a surprisingly good homogeneity of the water tree retardant additive(s) in the polymer article, which is comparable to the prior art articles.

Unexpectedly the masterbatch of water tree retardant additive can be used without sacrificing the above electric property.

The preferred article preparation process is a cable production process, wherein the cable comprises a conductor surrounded by one or more layers, wherein the process comprises the steps of
a) providing a masterbatch which comprises at least one water tree retardant additive and a carrier polymer, as defined above or below,
b) blending the masterbatch obtained from step a) with at least one polyolefin (A) to obtain a polymer composition as defined above or below, and
c) applying the polymer composition of step b) on a conductor for forming at least one layer of said at least one or more layers.

Preferably, the polymer composition is prepared in connection with the cable production line.

Therefore, the inventive process provides the advantage of adding the water tree retardant additive(s) in form of a MB prior to or during the formation of the cable layer without deteriorating water tree retardant properties of the resulting power cable.

It is evident for a skilled person that further component(s), such as further additive(s), can be present in any of the components of the above processes of the invention or can be added at any stage during the preparation process of a polymer composition and/or an article.

Examples of suitable further additive(s) for the polymer composition are additives, which are conventionally used in polymer compositions, i.a. crosslinking agent(s) as mentioned above, antioxidant(s), stabiliser(s), processing aid(s), crosslinking booster(s), scorch retarders (SR), flame retardant additive(s), water tree retardant additive(s), acid scavenger(s), inorganic filler(s), voltage stabilizer(s), and any mixtures thereof, which may be used in conventional amounts.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

The polymer composition of the process of the invention is preferably crosslinkable and is used for producing a crosslinkable article, preferably a crosslinkable layer of a cable.

The preferable subgroups and embodiments of the above steps, components, properties and also further features are described further below and they apply generally to said polymer composition and to the process thereof, to end applications and to any processes thereof, and can be combined in any combination.

WTR Additives for Polymer Composition

The preferred at least one water tree retardant additive is a well known type of additive used typically in wire and cable applications, e.g. in insulation layers, and can be of any type of additive that has water tree retarding property. Preferably the at least one WTR additive of said masterbatch is a polar water tree retarding additive. Said masterbatch of the polymer composition of the invention comprises preferably one or more water tree retardant additive(s) which comprises at least one ether and/or ester group containing compound, preferably the one or more WTR additive(s) is selected from the group comprising, preferably consisting of, 1) a polyethylene glycol(s), 2) a glycerol ester compound(s), 3) a polypropylene glycol(s), 4) an amido group containing fatty acid ester(s), 5) an ethoxylated and/or propoxylated pentaerythritol(s), 6) an alpha-tocopherol ester(s), 7) an ethoxylated and/or propoxylated fatty acid(s), including any derivatives of the compounds of groups 1)-7), or from any mixture(s) of WTR additive(s) of the group(s) of 1)-7). In addition to the preferred at least one WTR additive(s) of group 1)-7), the MB may comprise further WTR additive(s).

Within the context of the present invention, it is sufficient to add at least one of these additives to the masterbatch. However, it is also possible to add any combination of these additives to the masterbatch. Preferable combinations of WTR additives include 1) a polyethylene glycol(s) with 2) a glycerol ester(s), 1) a polyethylene glycol with 4) an amido group containing fatty acid ester, 1) a polyethylene glycol with 3) a polypropylene glycol, in particular a propylene glycol block copolymer consisting of polypropylene glycol and polyethylene glycol of the formula $HO(CH_2CH_2O)_x(CH(CH_3)CH_2O)_y(CH_2H_2O)_zH$ or $HO(CH(CH_3)CH_2O)_x(CH_2CH_2O)_y(CH(CH_3)CH_2O)_zH$; 1) polyethylene glycol with an 5) ethoxylated and/or propoxylated fatty acid; 2) a glycerolester compound with 5) an ethoxylated and/or propoxylated pentaerythritol and 6) an alpha-tocopherol ester such as alpha-tocopherol acetate; or 7) a glycerol ester compound with 3) a polypropylene glycol. Preferred WTR additive combination is selected from 1) a polyethylene glycol(s), 2) a glycerol ester(s) or a mixture of 1) a polyethylene glycol(s) and 2) a glycerol ester(s).

As to 1) polyethylene glycols, preferred polyethylene glycol has the formula $HO(CH_2CH_2O)_xH$.

In a preferred embodiment, the polyethylene glycol (PEG) has a weight average molecular weight of from 1000 to 100,000 g/mol, preferably of 1000 to 50000 g/mol, prior to use in the process of the invention. More preferably, molecular weight is 4000 to 35000 g/mol. It is evident for a skilled person in the art that processing of polyethylene glycol can affect, e.g. reduce, the molecular weight. Preferred polyethylene glycols are well known and commercially available, and as a one suitable example of PEG(s), reference is made to EP966003.

Within the context of the present invention, 2) a glycerol ester compound is an ester obtained by esterification of glycerol or a polyglycerol with at least one carboxylic acid. In a preferred embodiment, the glycerol ester compound has a formula (I) of $$R^1O[C_3H_5(OR^2)O]_nR^3 \qquad (I)$$

where n≥1, preferably n=1-25, $R^1$, $R^2$ and $R^3$ are the same or different, preferably designate hydrogen or the residue of a carboxylic acid with preferably 8 to 24 carbon atoms in the molecule. The glycerol ester compound has at least two free OH groups and at least one residue of a carboxylic acid. The compound of the general formula (I) is a monomer or polyglycerol ester, where at least one OH group forms an ester with a carboxylic acid with 8 to 24 carbon atoms. Preferably the compound of formula (I) is a monoester, i.e. it contains one rest of a carboxylic acid with 8 to 24 carbon atoms per molecule. Further, the ester forming carboxylic acid, preferably forms the ester with a primary hydroxylic group of the glycerol compound. The compound of formula (I) may include 1 to 25, preferably 1 to 20, more preferably 1 to 15, most preferably 3 to 8 glycerol units, i.e. n in the formula (I) is preferably 1 to 25, 1 to 20, 1 to 15, or 3 to 8.

When $R^1$, $R^2$ and $R^3$ in formula (I) do not designate hydrogen they designate the residue of a carboxylic acid with 8 to 24 carbon atoms. These carboxylic acids may be saturated or unsaturated and branched or unbranched. Non-limiting examples of such carboxylic acids are lauric acid, myristic acid, palmitic acid, stearic acid, oleic acid, linolenic acid and linoleic acid. When the carboxylic residue is unsaturated, the unsaturation may be utilized for binding the compound of formula (I) to the polyolefin of the composition and thus effectively prevent migration of the compound from the composition. In formula (I), $R^1$, $R^2$, $R^3$ may designate the same carboxylic acid residue, such as stearoyl or different carboxylic acid residues such as stearoyl and oleoyl.

3) The polypropylene glycol is a propylene glycol polymer or propylene glycol copolymer, preferably a propylene glycol copolymer, more preferably a propylene glycol block copolymer and most preferably a propylene glycol block copolymer comprising propylene glycol and ethylene glycol. Most preferably, the propylene glycol block copolymer is of the formula $HO(CH_2CH_2O)_x(CH(CH_3)CH_2O)_y(CH_2CH_2O)_zH$ or $HO(CH(CH_3)CH_2O)_x(CH_2CH_2O)_y(CH(CH_3)CH_2O)_zH$.

Additionally, it is preferred that the propylene glycol polymer as defined above, preferably propylene glycol block copolymer comprising ethylene glycol, has a weight average molecular weight from 2500 to 40000 g/mol, more preferably from 2800 to 35000 g/mol, still more preferably from 3100 to 33000 g/mol and most preferably the molecular weight of the polypropylene glycol is about 10000 g/mol, prior to use in the process of the invention. Additionally, it is preferred that the amount calculated of the ethylene glycol units in the total propylene glycol, preferably propylene glycol block copolymer comprising ethylene glycol, ranges from 40 to 60 wt %, more preferred from 45 to 55 wt %, more preferred from 48 to 52 wt % and the most preferred value is about 50 wt %.

Also a pentaerythritol can be the base for these block structures comprising propylene glycol and ethylene glycol units as described above.

4) The amido group containing fatty acid ester is preferably of the following general formula

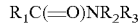

whereby $R_1$ is the residue of a fatty acid which is an aliphatic saturated hydrocarbon chain with preferably 1 to 30 carbon atoms, more preferably 1 to 20 carbon atoms. It is additionally preferred that the aliphatic saturated hydrocarbon chain is non-branched. $R_2$ and $R_3$ can be every organic residue but it is preferred that $R_2$ or $R_3$ is an aliphatic saturated hydrocarbon chain, preferably a non-branched aliphatic saturated alcohol, still more preferably a non-branched aliphatic saturated alcohol with 1 to 30 carbon atoms and most preferred $R_2$ or $R_3$ is ethanol.

Furthermore, it is preferred that $R_2$ or $R_3$ is polyoxyethylene or polyoxypropylene, most preferred polyoxyethylene or polyoxypropylene comprising 6 to 12 ether bonds. It is still more preferred that $R_2$ is an alcohol as defined above and $R_3$ is polyoxyethylene or polyoxypropylene as defined above.

The most preferred amido group containing fatty acid esters are polyethoxyethylene-mono-ethanolamide of alkyl fatty acids (CAS 157707-44-3) and therefrom the most preferred components are polyethoxy ethylene-monoethanol amide coconut oil fatty acids (CAS 68425-44-5).

5) The ethoxylated and/or propoxylated pentaerythritol can be a mixture of an ethoxylated pentaerythritol and a propoxylated pentaerythritol or can be a compound which is ethoxylated and propoxylated within the same molecule. Preferably, it is of the formula $C(CH_2O(CH_2CH_2O)_nH)_4$ whereby an n is 30 to 500, more preferably 30 to 300, more preferred 50 to 200 and most preferred 100-200. Moreover, it is preferred that the ethoxylated or propoxylated or a mix ethoxylated/propoxylated pentaerythritol component, preferably of the formula $C(CH_2O(CH_2CH_2O)_nH)_4$, has a weight average molecular weight of 7000 to 30000 g/mol, more preferably from 18000 to 25000 g/mol and most preferred about 20000 g/mol. Moreover, it is preferred that the ethoxylated pentaerythritol component, preferably of the formula $C(CH_2O(CH_2CH_2O)_nH)_4$, has a melting point measured according ISO3016 of 50 to 70° C., more preferred of 55 to 60° C. and most preferred about 60° C. The density (measured according DIN 51562 (70° C.)) of the ethoxylated pentaerythritol, preferably of the formula $C(CH_2O(CH_2CH_2O)_nH)_4$, typically varies from 900 to 1150 g/cm³, preferably from 950 to 1000 g/cm³. It is additionally preferred that the melt viscosity for the ethoxylated pentaerythritol, preferably of the formula $C(CH_2O(CH_2CH_2O)_nH)_4$, measured according to DIN 51562 (70° C.) ranges preferably between 3000 to 6000 mm²/s, more preferably 3500 to 5500 mm²/s, most preferred 4000 to 5000 mm²/s.

It is especially preferred that the ethoxylated pentaerythritol is a branched pentaerythritol based ethyleneoxide-copolymer with the formula $C(CH_2O(CH_2CH_2O)_{450}H)_y$, having a weight average molecular weight of about 20000 g/mol, melting point (ISO3016) of about 60° C., a density at 70° C. (DIN 51562) of about 1.085 g/cm³ and a melt viscosity at 70° C. (DIN 51562) of 4000-5000 mm²/s (Clariant, polyglycol P10/20000 data sheet issued January 03).

7) The ethoxylated and/or propoxylated fatty acid is a fatty acid as defined above which comprises polyoxyethylene and/or polyoxypropylene residues as defined above on the ester group. It is preferred that ethoxylated and/or propoxylated fatty acids are oleic acid propylene-ethylene adducts, more preferred with 6 to 12 ether bonds per chain.

A preferred ethoxylated fatty acid is a commercially available ethylene oxide condensation product of a saturated fatty acid, such as ethylene oxide condensation product of a saturated fatty acid with a density (50° C.) of approximately 1000 kg/m³, melting range of 34 to 42° C. and with a viscosity (50° C.) of about 50 mPa×s (Akzo Nobel, Besal Fintex 10 as on the datasheet issued 21 Mar. 2000).

Polymer for the Carrier Polymer and the Polyolefin (A)

The carrier polymer in the masterbatch for preparing the polymer composition of the invention can be any polymer, more preferably any polyolefin. Respectively, the polyolefin (A) used in the polymer composition can be any polyolefin.

The below description of the preferable polyolefin and any preferable subgroups thereof apply equally both to the preferable carrier polymer(s) present in the MB (referred below as carrier polymer) and to the preferable polyolefin(s) (A) present in the polymer composition. Therefore the description of the preferred polyolefins is not presented separately for the carrier polymer and for the polyolefin (A), but is given below commonly for both (to avoid superfluous repetition). However, it is evident, and to be understood, that the preferable carrier polymer(s) of the MB and the preferable polyolefin(s) (A) of the polymer composition are each independently selected from any of the below preferable polyolefins and subgroups thereof.

Accordingly the carrier polymer(s) of the MB and the polyolefin(s) (A) used for preparing the polymer composition need not to be identical polymer(s), but, as evident for skilled person, are preferably chosen to be compatible with each other so that the polymer composition is suitable for the article production.

In one embodiment of the polymer composition the carrier polymer of the MB is different from the polyolefin (A).

The polyolefin preferable for the invention is shortly referred herein as polyolefin and can be any polyolefin suitable for the production of an article, preferably a layer of a cable, preferably a layer of a power cable. Such polyolefin may optionally be unsaturated.

The polyolefin can be e.g. a commercially available polymer or can be prepared according to or analogously to known polymerization process described in the chemical literature.

The polyolefin preferably consists of one polymer which may contain one or more polymer components, i.e. can be unimodal or multimodal, e.g. bimodal, e.g. with respect to molecular weight distribution (MWD) and/or comonomer distribution.

The polyolefin is preferably a polyethylene or polypropylene. Where herein it is referred to a "polymer", e.g. polyolefin, such as polyethylene, this is intended to mean both a homo- and copolymer, e.g. an ethylene homo- and copolymer. The polyolefin copolymer may contain one or more comonomer(s).

As well known "comonomer" refers to copolymerisable comonomer units. The comonomers are preferably selected from polar and non-polar comonomers or from mixtures thereof. The polar comonomer preferably contains hydroxyl group(s), alkoxy group(s), carbonyl group(s), carboxyl group(s), ether group(s) or ester group(s), or any mixture thereof. The non-polar comonomer is another comonomer than the polar comonomer and preferably is avoid (i.e. does not contain) hydroxyl group(s), alkoxy group(s), carbonyl group(s), carboxyl group(s), ether group(s) or ester group(s).

Where the polyolefin is a polyethylene, the polymer may be produced in a high pressure process or in a low pressure process. The high pressure process is typically carried out by radical polymerization of ethylene in the presence of an initiator and optionally one or more comonomer(s). The low pressure process is typically carried out by polymerizing ethylene in the presence of a coordination catalyst system, for example a chromium, Ziegler-Natta or single-site catalyst system, and optionally one or more comonomer(s), which are preferably one or more non-polar comonomer(s) as defined above or below. Both processes, initiators and catalysts are well known and documented in the literature.

When the polyolefin is a polypropylene, this may be a propylene homo- or copolymer and/or a heterophasic polypropylene. Said different types of polypropylene and their preparation process, e.g. low pressure process, are well known and documented in the polymer literature.

Furthermore, where the polyolefin is a polypropylene, it is preferred that it has an $MFR_2$ (230° C., 2.16 kg) of from 0.001 to 25 g/10 min.

In a preferred embodiment, the polyolefin is an ethylene homo- or copolymer. The ethylene copolymer may comprise one or more comonomers, preferably one or more comonomer(s) selected from polar comonomer(s), non-polar comonomers(s) or a mixture of polar comonomer(s) and non-polar comonomer(s). In the case of an ethylene copolymer as said polyolefin, it is further preferred that it comprises comonomer(s) in a total amount of 0.001 to 50 wt.-%, more preferably of 0.1 to 40 wt.-%, more preferably less than 35 wt.-%, still more preferably of less than 30 wt.-%, more preferably less than 25 wt.-%, of one or more comonomers based on the amount of the polyolefin, depending on the used comonomer(s) and/or desired end application of the polymer composition.

Preferably, the density of the ethylene homo or -copolymer as said polyolefin is higher than 0.860 $g/cm^3$. Furthermore, preferably the density of the ethylene homo or -copolymer of said polyolefin for the carrier polymer and as said polyolefin (A) is not higher than 0.960 $g/cm^3$.

The $MFR_2$ (2.1.6 kg, 190° C.) of the ethylene homo or -copolymer as said polyolefin is preferably from 0.01 to 50 g/10 min, more preferably is from 0.1 to 20 g/10 min, still more preferably is from 0.2 to 15 g/10 min, and most preferably is from 0.2 to 10 g/10 min.

Still further, it is preferred that the polyolefin is a polyethylene, more preferably a polyethylene which has been produced in a high pressure (HP) process using free radical polymerization resulting in low density polyethylene (LDPE). The polymerization generally is performed at pressures of 100 to 400 MPa and at temperatures of 80 to 350° C. Such process are well known and well documented in the literature.

The LDPE as said polyolefin may be a low density ethylene homopolymer (referred herein as LDPE homopolymer) or a copolymer of low density ethylene (referred herein as LDPE copolymer). The LDPE copolymer may contain one or more comonomers which are preferably selected from the polar comonomer(s), non-polar comonomer(s) or from a mixture of the polar comonomer(s) and non-polar comonomer(s), as defined above or below, or from a mixture thereof. Moreover, said LDPE homopolymer or LDPE copolymer as said polyolefin may optionally be unsaturated As a polar comonomer for the LDPE copolymer as said polyolefin, comonomer(s) containing hydroxyl group(s), alkoxy group(s), carbonyl group(s), carboxyl group(s), ether group(s) or ester group(s), or a mixture thereof, can used. More preferably, comonomer(s) containing carboxyl and/or ester group(s) are used as said polar comonomer. Still more preferably, the polar comonomer(s) of LDPE copolymer is selected from the groups of acrylate(s), methacrylate(s) or acetate(s), or any mixtures thereof. If present in said LDPE copolymer, the polar comonomer(s) is preferably selected from the group of alkyl acrylates, alkyl methacrylates or vinyl acetate, or a mixture thereof. Further preferably, said polar comonomers are selected from $C_1$- to $C_6$-alkyl acrylates, $C_1$- to $C_6$-alkyl methacrylates or vinyl acetate. Still more preferably, said polar LDPE copolymer is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer as said polyolefin, comonomers other than the above defined polar comonomers can be used. Preferably, the non-polar comonomers are other than comonomer(s) containing hydroxyl group(s), alkoxy group(s), carbonyl group(s), carboxyl group(s), ether group(s) or ester group(s). One group of preferable non-polar comonomers comprise, preferably consists of, monounsaturated (=one double bond) comonomer(s), preferably olefins, preferably alpha-olefins, more preferably $C_3$ to $C_{10}$ alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described below in relation to unsaturated LDPE copolymers.

If the LDPE is a copolymer, it is preferred that it includes 0.001 to 50 wt.-%, more preferably 0.1 to 40 wt.-%, still more preferably less than 35 wt.-%, still more preferably less than 30 wt.-%, more preferably less than 25 wt.-%, of one or more comonomers.

The polyolefin may optionally be an unsaturated polyolefin, i.e. a polyolefin comprising carbon-carbon double bonds. The "unsaturated" means herein that the polyolefin contains carbon-carbon double bonds/1000 carbon atoms in a total amount of at least 0.4/1000 carbon atoms. Then the polyolefin is preferably an unsaturated polyethylene, more preferably an unsaturated LDPE, even more preferably an unsaturated LDPE homopolymer or an unsaturated LDPE copolymer. When polyunsaturated comonomer(s) are present in the LDPE polymer as said unsaturated polyolefin, then the LDPE is an unsaturated LDPE copolymer.

In case of an unsaturated LDPE homopolymer the double bonds can be provided e.g. by polymerising ethylene in the presence of one or more chain transfer agents (CTAs), such as propylene, as known in the art. In case of LDPE copolymer the double bonds can be provided e.g. by copolymerising ethylene with at least one polyunsaturated comonomer, optionally together with one or more other comonomer(s), and optionally in the presence of one or more chain transfer agents (CTAs), such as propylene.

The unsaturated comonomers suitable for the unsaturated polyolefin preferably consist of a straight carbon chain with at least 8 carbon atoms and at least 4 carbons between the non-conjugated double bonds, of which at least one is terminal, more preferably, said polyunsaturated comonomer is a diene, preferably a diene which comprises at least eight carbon atoms, the first carbon-carbon double bond being terminal and the second carbon-carbon double bond being non-conjugated to the first one. Preferred dienes are selected from $C_8$ to $C_{14}$ non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, the diene is selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the C—C double bonds, preferably to the total amount of the vinyl groups. Herein, when a compound which can also act as comonomer, such as propylene, is used as CTA for providing double bonds, then said copolymerisable comonomer is not calculated to the comonomer content.

The unsaturated polyolefin, more preferably unsaturated polyethylene, has preferably a total amount of carbon-carbon double bonds/1000 carbon atoms of more than 0.4. The upper limit of the amount of carbon-carbon double bonds present in the polyolefin is not limited and may preferably be less than 5.0/1000 carbon atoms, preferably less than 3.0/1000 carbon atoms.

The term "total amount of carbon-carbon double bonds" present in the unsaturated polyolefin, refers preferably to those double bonds originating from vinyl groups, vinylidene groups and trans-vinylene groups. The amount of each type of double bond is measured as indicated in the experimental part. The total amount of vinyl groups is preferably higher than 0.05/1000 carbon atoms, still more preferably higher than 0.08/1000 carbon atoms, and most preferably higher than 0.11/1000 carbon atoms. Preferably, the total amount of vinyl groups is lower than 4.0/1000 carbon atoms.

The unsaturation can be provided to the polymer composition i.a. by means of the carrier polymer(s), the polyolefin(s) (A), a low molecular weight (Mw) compound(s), such as crosslinking booster or scorch retarder additive(s), or any combinations thereof, preferably at least by means of polyolefin(s) (A). If two or more above sources of double bonds are used, then the total amount of double bonds in the polymer composition is preferably the sum of the double bonds present in the two or more sources.

The most preferred polyolefin (A) is the optionally unsaturated polyethylene homopolymer or copolymer of ethylene with one or more comonomers selected from non-polar comonomer(s), polar comonomer(s) or any mixtures thereof and produced in a high pressure process or a low pressure process, more preferably the optionally unsaturated polyethylene which has been produced in a high pressure (HP) process using free radical polymerization resulting in low density polyethylene (LDPE), preferably the optionally unsaturated LDPE homopolymer or the optionally unsaturated LDPE copolymer of ethylene with one or more comonomer(s) selected from polar comonomer(s), non-polar comonomer(s) or any mixture thereof, including any of the preferable subgroups thereof, as defined above, or a mixture of such optionally unsaturated LDPE homopolymer(s) or copolymer(s), most preferably the optionally unsaturated LDPE homopolymer or the optionally unsaturated LDPE copolymer of ethylene with one or more non-polar comonomer(s), preferably a diene as defined above.

The most preferred carrier polymer is the optionally unsaturated polyethylene, more preferably the optionally unsaturated polyethylene which has been produced in a high pressure (HP) process or in a low process, preferably the optionally unsaturated polyethylene which has been produced in a high pressure (HP) process using free radical polymerization resulting in low density polyethylene (LDPE), preferably the optionally unsaturated LDPE homopolymer or LDPE copolymer of ethylene with one or more comonomer(s) selected from polar comonomer(s), non-polar comonomer(s) or any mixture thereof, including any of the preferable subgroups thereof, as defined above, or a mixture of such optionally unsaturated LDPE homopolymer(s) or copolymer(s).

In one preferable embodiment the carrier polymer is selected from

A) a non-polar polyethylene, which is selected from an optionally unsaturated polyethylene homopolymer or an optionally unsaturated copolymer of ethylene with one or more comonomer(s) consisting of non-polar comonomer(s) as defined above or below, which polyethylene homo- or copolymer is produced in a high pressure process or a low pressure process, preferably in a high pressure process, more preferably from an optionally unsaturated LDPE homopolymer or from an optionally unsaturated LDPE copolymer of ethylene with one or more comonomer(s) consisting of non-polar comonomer(s) which are other than the polar comonomer(s), as defined above or below, B) a polar polyethylene, an optionally unsaturated copolymer of ethylene with one or more polar comonomer(s) and optionally with other comonomer(s), as defined above or below, which ethylene copolymer is produced in a high pressure process or a low pressure process, preferably in high pressure process, more preferably an optionally unsaturated LDPE copolymer of ethylene with one or more polar comonomer(s) and optionally with other comonomer(s), as defined above or below, or any mixture of A) the non-polar polyethylene and/or B) the polar polyethylene.

Accordingly, the most preferred preparation process of the polymer composition of the invention comprises the steps of a) providing at least one MB, preferably in the form of pellets as defined above, selected from
- a MB A), which comprises
  - one or more WTR additive(s), wherein the total amount of the one or more WTR additive(s) is of less than 50 wt %, preferably of up to 30 wt %, more preferably of from 1.5 to 20 wt %, more preferably of from 2.0 to 15 wt %, and even more preferably of from 3.0 to 15 wt %, based on the total amount (wt %) of the MB A), and wherein at least one WTR additive(s) is an organic compound containing at least one ether and/or ester group as defined above, and
  - a carrier polymer in an amount of at least 50 wt %, preferably of at least 70 wt %, more preferably of from 80 to 98.5 wt %, more preferably of from 85 to 98.0 wt %, more preferably of from 85 to 97.0 wt %, based on the total amount of the MB A), and wherein the carrier polymer is a non-polar polyethylene, which is selected from an optionally unsaturated polyethylene homopolymer or an optionally unsaturated copolymer of ethylene with one or more comonomer(s) consisting of non-polar comonomer(s) as defined above or below, which polyethylene homo- or copolymer is produced in a high pressure process or a low pressure process, preferably in a high pressure process, more preferably from an optionally unsaturated LDPE homopolymer or from an optionally unsaturated LDPE copolymer of ethylene with one or more comonomer(s) consisting of non-polar comonomer(s) which are other than the polar comonomer(s), preferably a diene, as defined above or below;
- a MB B), which comprises
  - one or more WTR additive(s), wherein the total amount of the one or more WTR additive(s) is of less than 50 wt %, preferably of up to 30 wt %, more preferably of from 1.5 to 20 wt %, more preferably of from 2.0 to 15 wt %, and even more preferably of from 3.0 to 15 wt %, based on the total amount (wt %) of the MB B), and wherein at least one WTR additive(s) is an organic compound containing at least one ether and/or ester group as defined above, and
  - a carrier polymer in an amount of at least 50 wt %, preferably of at least 70 wt %, more preferably of from 80 to 98.5 wt %, more preferably of from 85 to 98.0 wt %, more preferably of from 85 to 97.0 wt %, based on the total amount of the MB B), and wherein the carrier polymer is an optionally unsaturated polar polyethylene, preferably an optionally unsaturated copolymer of ethylene with one or more polar comonomer(s) and optionally with other comonomer(s), as defined above or below, which ethylene copolymer is produced in a high pressure process or a low pressure process, preferably in high pressure process, more preferably an optionally unsaturated LDPE copolymer of ethylene with one or more polar comonomer(s) and optionally with other comonomer(s), as defined above or below, more preferably, said a LDPE copolymer of ethylene with $C_1$- to $C_4$-alkyl acrylate, such as methyl, ethyl, propyl or butyl acrylate, or vinyl acetate, more preferably with methyl acrylate, ethyl acrylate, propyl acrylate or butyl acrylate; or
- a mixture of MB A) and MB B); and b) blending the MB of step a) with at least one polyolefin (A), preferably with an optionally unsaturated polyethylene homopolymer or copolymer of ethylene with one or more comonomers selected from non-polar comonomer(s), polar comonomer(s) or any mixtures thereof and produced in a high pressure process or a low pressure process, more preferably an optionally unsaturated polyethylene which has been produced in a high pressure (HP) process using free radical polymerization resulting in low density polyethylene (LDPE), preferably an optionally unsaturated LDPE homopolymer or an optionally unsaturated LDPE copolymer of ethylene with one or more non-polar or polar comonomer(s), including any of the preferable subgroups thereof as defined above or below, or a mixture of such optionally unsaturated LDPE homopolymer(s) or copolymer(s), more preferably an optionally unsaturated LDPE homopolymer or an optionally unsaturated LDPE copolymer of ethylene with one or more comonomer(s) consisting of non-polar comonomer(s) which are other than the polar comonomer(s), preferably of a diene, as defined above or below.

This most preferred preparation process of the polymer composition preferably comprises the steps of: a) providing the MB A), MB B) or a mixture thereof in form of pellets, and b) blending the pellets of the MB of step a) with at least one polyolefin (A) by meltmixing as described above.

In a preferred embodiment of MB A) and of MB B) the carrier polymer is saturated. Furthermore, in a preferred embodiment the polyolefin (A) is saturated.

In this most preferred preparation process of the polymer composition the at least one WTR additive is selected from the group comprising, preferably consisting of, 1) a polyethylene glycol(s), 2) a glycerol ester compound(s), 3) a polypropylene glycol(s), 4) an amido group containing fatty acid ester(s), 5) an ethoxylated and/or propoxylated pentaerythritol(s), 6) an alpha-tocopherol ester(s), 7) an ethoxylated and/or propoxylated fatty acid(s), including any derivatives of the compounds of groups 1)-7), or from any mixture(s) of WTR additive(s) of the group(s) 1)-7), as defined above. More preferably the MB contains one WTR additive or two different WTR additives, wherein at least one or two WTR additive(s) are selected from any of the compounds of the above group(s) 1)-7). In this embodiment of the preparation process of polymer composition said MB comprises most preferably one or two WTR additive(s) selected from 1) polyethylene glycol(s), 2) glycerol ester(s) or from a combination of 1) polyethylene glycol(s) and 2) glycerol ester(s).

In this most preferred preparation process of the polymer composition it is further preferable that the MB A), if present, is b) blended to the polyolefin (A) in an amount of 6.0 to 15 wt %, preferably of 7.0 to 13 wt %, most preferably of 7.5 to 12 wt %, based on the total weight of the polymer composition.

In this most preferred preparation process of the polymer composition it is further preferable that the MB B), if present, is b) blended to the polyolefin (A) in an amount of 2.0 to 15 wt %, preferably of 3.0 to 13 wt %, most preferably of 4.0 to 12 wt %, based on the total weight of the polymer composition.

In case the preparation processes of crosslinkable polymer composition and of crosslinkable article, preferably cable, then at least the polyolefin (A) is preferably crosslinkable. Crosslinking may be achieved by radical reaction using irradiation or preferably using a crosslinking agent, which is typically a free radical generating agent, or by the incorporation of crosslinkable groups into polyolefin (A).

The free radical generating crosslinking agent can be a radical forming crosslinking agent which contains at least one —O—O— bond or at least one —N=N— bond. More preferably, the crosslinking agent is peroxide, whereby the crosslinking is preferably effected using a well known peroxide crosslinking technology that is based on free radical crosslinking and is well described in the field.

Peroxide is the preferred free radical generating crosslinking agent. Non-limiting examples are organic peroxides, such as di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy) hexane, 1,1-di(tert-butylperoxy)cyclohexane, 1,1-di(tert amylperoxy)cyclohexane, or any mixtures thereof. Preferably, the peroxide is selected from 2,5-di(tert-butylperoxy)-2,5-dimethylhexane, di(tert-butylperoxyisopropyl)benzene, dicumylperoxide, tert-butylcumylperoxide, di(tert-butyl) peroxide, or mixtures thereof. Most preferably, the peroxide is dicumylperoxide.

As mentioned above crosslinking may also be achieved by incorporation of crosslinkable groups, preferably hydrolysable silane groups, into polyolefin (A). The hydrolysable silane groups may be introduced into the polyolefin by copolymerisation of e.g. ethylene monomers with silane group containing comonomers or by grafting, i.e. by chemical modification of the polymer by addition of silane groups mostly in a radical reaction. The hydrolysable silane groups are typically then crosslinked by hydrolysis and subsequent condensation in the presence of a silanol-condensation catalyst and $H_2O$ in a manner known in the art. Also silane crosslinking technique is well known in the art.

The invention also provides independently a masterbatch selected from the MB A); MB B) or a mixture thereof, including the preferable subgroups thereof, as defined in relation to the most preferred preparation process of the polymer composition or the most preferable preparation process of the MB A) or MB B). The MB A), MB B) or the mixture thereof is preferably in the form of pellets.

In a preferable embodiment, the MB of the invention does not comprise any silane containing compounds or tin compounds.

The invention provides independently polymer composition produced according to any of the preceding claims 1 to 9 comprising
a) a masterbatch (MB) which comprises at least one water tree retardant (WTR) additive and a carrier polymer, and
b) at least one polyolefin (A).

More preferably, the polymer composition is as defined in relation to the most preferred preparation process of the polymer composition and comprises
a) the masterbatch selected from the MB A), MB B) or a mixture thereof, including the preferable subgroups thereof, as defined above, and
b) the polyolefin (A), including the preferable subgroups thereof, as defined above. The polymer composition may be crosslinkable, whereby it preferably comprises, as well known, a crosslinking agent, preferably peroxide, as defined above or crosslinkable group(s).

Preferably the polymer composition comprises
a) a masterbatch (MB) which comprises at least one water tree retardant (WTR) additive and a carrier polymer, and
b) at least one polyolefin (A) which is different from the carrier polymer.

In one preferable embodiment, no added fluorocarbon polymer is present in the polymer composition of the invention.

The MB of the invention is most preferably prepared according to steps a) and b) of the preparation process and the polymer composition of the invention is most preferably prepared according to the preparation process of the invention, more preferably both MB and polymer composition are prepared according to the most preferred preparation process of the polymer composition.

Cable of the Invention

As mentioned above a preferred article manufacturing process of the invention is the process for producing a cable comprising a conductor surrounded by one or more layers, wherein at least one of said one or more layers comprises the polymer composition of the invention. In this embodiment a cable is produced, whereby said process comprises at least the steps of
a) providing a masterbatch by incorporating at least one water tree retardant additive to a carrier polymer,
b) blending by meltmixing the masterbatch obtained from step a) with at least one polyolefin (A) to obtain said polymer composition,
c) applying the polymer composition obtained from step b) on a conductor to form one or more cable layers,
and, optionally, d) crosslinking the layer(s) of the cable of step c). In this embodiment the melt mixture obtained from step b) is preferably applied on the conductor.

Preferably, the layers are applied by (co)extrusion.

The term "conductor" means herein above and below that the conductor comprises one or more wires. Moreover, the cable may comprise one or more such conductors. Preferably the conductor is an electrical conductor.

The term "(co)extrusion" means herein that in case of two or more layers, said layers can be extruded in separate steps, or at least two or all of said layers can be coextruded in a same extrusion step, as well known in the art.

As to the preferred cable production process, the polymer composition is prepared in connection with, preferably during, the cable production process, a) by providing the MB in the form of pellets, b) blending the pellets of MB obtained from step a), optionally together with further component(s), to the at least one polyolefin (A) by meltmixing to obtain said polymer composition, and c) applying the obtained melt mixture of the polymer composition of step b) on a conductor to form one or more cable layers. The steps a) to b) for preparing the polymer composition is preferably carried out according to the most preferred preparation process of the polymer composition as defined above. In this embodiment the polyolefin composition can be prepared in a separate mixer prior to subjecting to a cable extruder or it can be prepared directly in the cable extruder before (co)extrusion to a cable layer(s).

In step b) of the cable preparation process, the mixing of the layer composition(s) is carried out at elevated temperature, which is typically at least above the melting or softening point of the polymer component(s) of the layer material, e.g. of at least 20° C., above the melting or softening point of at least said polymer component(s) of the layer composition, and, if crosslinking agent is present, then below the actual crosslinking temperature. Mixing may be effected in a separate mixer or typically in a cable extruder, or in both. After meltmixing in said extruder, the resulting meltmixed layer material is then (co)extruded in step c) on a conductor in a manner very well known in the field. Conventional mixers and conventional cable extruders, such as single or twins screw extruder, may be used in the process of the invention.

In a preferable cable process embodiment, a cable comprising at least an insulation layer is produced by c) applying the polymer composition obtained from step b) on a conductor for forming at least said insulation layer. Preferably the formed insulation layer consists of said polymer composition of step b).

The cable is preferably a power cable which means herein a cable that transfers energy operating at any voltage. The voltage applied to the power cable can be alternating (AC), direct (DC), or transient (impulse). In a preferred embodiment, the multi-layered article is a power cable operating at voltages higher than 1 kV.

In a further preferable cable process embodiment of the invention, a power cable comprising at least an inner semiconductive layer, an insulation layer and a semiconductive layer in the given order, is produced by c) applying the polymer composition obtained from step b) on a conductor for forming at least said insulation layer.

Crosslinkable and Crosslinked Article

In one embodiment of the article preparation process of the invention, at least the polyolefin (A) of the polymer composition from step b) is crosslinkable, whereby the process comprises a further step d) of crosslinking the article obtained from step c) at crosslinking conditions. In this embodiment in said step c) a cable is preferably produced by applying the polymer composition of said step b) on a conductor to form at least one layer, preferably an insulation layer and d) crosslinking the obtained layer of step c) in a known manner at crosslinking conditions. Preferably in this embodiment the crosslinking is carried out in the presence of a crosslinking agent. The crosslinking agent(s) may be provided in said MB, whereby in that case preferably in said pellets of MB; in polyolefin (A) or, preferably in any of the steps a) to c), preferably in step b), during the preparation process of the article, preferably of the cable, and more preferably in a continuous vulcanisation (CV) line of a cable.

The crosslinking agent can preferably added in liquid state, i.e. it can be in liquid form at ambient temperature, or is preheated above the melting or glass transition point thereof or dissolved in a carrier medium. The addition of crosslinking agent, preferably peroxide, can be effected in a known manner and is within the skills of person skilled in the art.

Crosslinking can be carried out at increased temperature which is chosen, as well known, depending on the type of crosslinking agent. E.g. for radical crosslinking, e.g. a temperature above 150° C., such as from 160 to 350° C., are typical, however without limiting thereto.

Preferably, crosslinking conditions are maintained until the crosslinked composition has a hot set elongation value of 175% or less at 200° C., when measured from crosslinked plaque samples according to IEC 60811-2-1 as described in "b) Measurement of hot set and permanent deformation" under Determination methods below. This method is also called "hot set" and indicates the degree of crosslinking. Lower hot set value means less thermal deformation and, consequently, higher degree of crosslinking. More preferably, the hot set elongation value is 120% or less, even more preferably 100% or less.

Furthermore, crosslinking conditions are preferably maintained until the crosslinked composition of the present invention has a permanent deformation of less than 15%, even more preferably of less than 10%. Hot set and permanent deformation is measured as described under determination method, "Hot set measurements".

As a result a crosslinked cable is obtained comprising at least one crosslinked layer of the polymer composition of the invention.

Since homogeneity of the polymer composition can improve properties of the resultant material, it is unexpectedly found that it is possible to obtain a polymer composition of the MB and polyolefin (A), and optional further component(s), which has a sufficient homogeneity, i.e. the components of the present invention do not form any separated phases.

As will be demonstrated below in the examples, the polymer composition prepared according to the process of the present invention results in a polymer article, either crosslinked or not, having an improved electric breakdown strength after wet ageing giving values in the same range as materials where the water tree retardant additive(s) have been added to polyolefins during compounding after the polymerisation.

Increasing the electric field applied to an insulation system, the dielectric material will get an electrical breakdown at a certain value, the so-called breakdown strength. This involves a destructive sudden flow of current leading to a conductive path through the dielectric material, which cannot any longer support an applied voltage. A dielectric usually is being used at nominal field well below the breakdown strength, but different kind of degradation processes (ageing), for example water treeing, may reduce the breakdown strength over time, possibly to such low levels that the system fails during service.

There are numerous ways to evaluate the resistance of the insulating material to water tree degradation. In the present invention, the method is based on "d) wet ageing test" and model cables as described under the Determination methods below. The model cables consisted of an inner semiconductive layer, insulation layer and an outer semiconductive layer. The insulation had a thickness of 1.5 mm. The ageing conditions were 9 kV, 50 Hz, 85° C. in the water filled conductor area, 70° C. in the surrounding water, and an ageing time of 1000 h. The breakdown strength of these model cables is determined before and after ageing. As shown below in the examples, assessment of water tree retarding properties of a polymeric material can be made on the basis of electric breakdown strength measurements after ageing in water. Polymers still having high breakdown strength after ageing in water are considered to have an improved resistance to the formation of water trees.

In a preferred embodiment, the polymer composition extruded to a model cable has an electric breakdown strength of at least 45 kV/mm after 1000 h wet ageing at the ageing conditions as described under Determination methods. More preferably, the electric breakdown strength is at least 50 kV/mm, preferably at least 55 kV/mm, still more preferably at least 60 kV/mm, most preferably at least 65 kV/mm.

The present invention is now described in further details by means of the following examples.

Determination Methods

Unless otherwise stated the below determination methods were used to determine the properties defined generally in the description part and claims and in the experimental part.

(a) Density

The density was measured according to ISO 1183D. The sample preparation was executed according to ISO 1872-2.

(b) Measurement of Hot Set and Permanent Deformation

Hot set elongation and permanent deformation are determined on crosslinked plaques. These plaques are prepared as follows: First, the pellets were melted at 115° C. at around 10 bar for 2 minutes. Then the pressure was increased to 200 bar, followed by ramping the temperature up to 165° C. The material was kept at 165° C. for 25 minutes and after that it was cooled down to room temperature at a cooling rate of 15° C./min. The thickness of the plaque was around 1.8 mm.

The hot set elongation as well as the permanent deformation were determined on samples taken from the crosslinked plaques. These properties were determined according to IEC 60811-2-1. In the hot set test, a dumbbell of the tested material is equipped with a weight corresponding to 20 N/cm². This specimen is put into an oven at 200° C. and after 15 minutes, the elongation is measured (difference in the distance between the reference marks after the heat treatment).

Subsequently, the weight is removed and the sample is allowed to relax for 5 minutes. Then, the sample is taken out from the oven and is cooled down to room temperature. The permanent deformation is determined.

(c) Melt Flow Rate

The melt flow rate is equivalent to the term "melt index" and is determined according to ISO 1133 and is indicated in g/10 min. Melt flow rate is determined at different loadings, such as 2.16 kg ($MFR_2$). Melt flow rate is determined at a temperature of 190° C. for polyethylene resins and at 230° C. for polypropylene resins.

(d) Wet Ageing Test

The wet ageing test is based on a procedure described in an article by Land H. G. and Schädlich H., "Model Cable Test for Evaluating the Ageing Behaviour under Water Influence of Compounds for Medium Voltage Cables", Conference Proceedings of Jicable 91, Jun. 24 to 28, 1991, Versaille, France and in the article by U. H. Nilsson "The Use of Model Cables for Evaluation of the Electrical Performance of Polymeric Power Cable Materials", Conference Proceedings of NORD-IS, Jun. 13 to 15, 2005, Trondheim, Norway. The wet ageing properties were evaluated on model cables. These cables consist of a 1.38 mm diameter Cu wire onto which an inner semiconductive layer consisting of a conventional commercial semiconductive polymer grade LE0592, supplied by Borealis, an insulation layer consisting of the test polymer composition (of the invention or a comparison polymer) and an outer semiconductive layer consisting of a conventional commercial semiconductive polymer grade LE0592, supplied by Borealis, are applied. The model cable has the following construction: inner semiconductive layer of 0.7 mm, insulation layer of 1.5 mm and outer semiconductive layer of 0.15 mm. The cables are extruded in a 1+2 extruder configuration and vulcanised in a dry-curing CCV tube, i.e. the material is crosslinked. The crosslinking is effected by the peroxides being present in the materials. After this the model cables are preconditioned at 80° C. for 72 h.

The Cu wire is removed and then replaced by a thinner Cu wire. The cables are put into water bath to be aged for 1000 h under electric stress and at a temperature of 70° C. of the surrounding water and at a temperature of the water in the conductor area of 85° C. The initial breakdown strength as well as the breakdown strength after 1000 h wet ageing are determined. The cables are prepared and aged as described below.

| | |
|---|---|
| Preconditioning: | 80° C., 72 h |
| Applied voltage: | 9 kV/50 Hz |
| Electric stress (max.): | 9 kV/mm |
| Electric stress (mean): | 6 kV/mm |
| Conductor temperature: | 85° C. |
| Water bath temperature: | 70° C. |
| Ageing time: | 1000 h |
| Deionized water in conductor and outside | |

Five specimens with 0.50 m active length from each cable are aged.

The specimens are subjected to ac breakdown tests (voltage ramp: 100 kV/min.) and the Weibull 63.2% values of the breakdown strength (field stress at the inner semiconductive layer) are determined before and after ageing.

(e) Amount of Double Bonds in the Polymer Composition or in the Unsaturated Polymer The below methods can be used for determining the amount of carbon-carbon double bonds present in an unsaturated polymer component or in an unsaturated polymer composition, as desired, and both are shortly referred below as polymer. The methods 1)-3), unless otherwise stated, are based upon the standard methods ASTM D3124-98 and ASTM D6248-98, wherein ASTM D3124-98 describes the determination of vinylidene groups/1000 C based upon 2,3-dimethyl-1,3-butadiene, ASTM D6248-98 describes the determination of vinyl groups/1000 C based on 1-octene and of trans-vinylene groups/1000 C based on trans-3-hexene.

1) The Total Amount of Carbon-Carbon Double Bonds Present in Polymer

For the determination of the extinction coefficient (=molar absorptivity) for these three types of double bonds, the following three compounds have been used: 1-decene for vinyl, 2-methyl-1-heptene for vinylidene and trans-4-decene for trans-vinylene, and the procedure as described in ASTM D3124-98 (section 10) and ASTM D6248-98 (section 10) was followed, except that peak height was used for the calculation instead of integrated peak area.

The total amount of double bonds was analysed by means of IR spectrometry and given as the amount of vinyl bonds, vinylidene bonds and trans-vinylene bonds per 1000 carbon atoms.

A base line was drawn from 980 $cm^{-1}$ to around 840 $cm^{-1}$ in the absorbance spectrum. The peak heights were determined at around 888 $cm^{-1}$ for vinylidene, around 910 $cm^{-1}$ for vinyl and around 965 $cm^{-1}$ for trans-vinylene:

$$B=[1/(C \times L)] \times A$$

wherein C=concentration of the carbon-carbon double bond to be measured (mol/l); L=cell thickness (mm); A=maximum absorbance (in our case the peak height) of the peak of the type of carbon-carbon double bond to be measured (mol/l). The amount of carbon-carbon double bonds is determined from a film sample consisting of the polymer. The film samples are 0.5-1 mm thick and are prepared by compression moulding. The films are analysed with FT-IR and scanned with a resolution of 4 $cm^{-1}$. The total amount of carbon double bonds expressed as "number/1000 C" is calculated from the following equations:

$$\text{Vinyldiene}/1000C=(A \times 14)/(18.24 \times L \times D)$$

wherein the molar absorptivitiy B is 18.24 calculated from the analyses of the solutions containing 2-methyl-1-heptene.

$$\text{Vinyl}/1000C=(A \times 14)/(13.13 \times L \times D)$$

wherein the molar absorptivitiy B is 13.13 calculated from the analyses of the solutions containing 1-decene.

$$\text{Trans-vinylene}/1000C=(A \times 14)/(15.14 \times L \times D)$$

wherein the molar absorptivitiy B is 15.14 calculated from the analyses of the solutions containing trans-4-decene. A=absorbance (here peak height), L=film thickness (mm), D=density of the material (g/$cm^3$).

2) Determination of the Number of Vinyl Groups Originating from the Polyunsaturated Comonomer Per 1000 C Present in a Polymer The amount of vinyl groups originating from the polyunsaturated comonomer per 1000 C was determined as described above.

For this determination there is a need to have a sample of the polymer to be analysed (i.e. the polymer that has been polymerised in the presence of a polyunsaturated comonomer) and to have a sample of a reference polymer. This reference polymer needs then to be polymerised under as similar conditions as the polymer to be analysed (i.e. the one containing the polyunsaturated comonomer) for example the same type of reactor set up, as similar temperature settings, pressure, production rate, monomer feed, type and amount of CTA, if used, etc, but with the only difference that the polyunsaturated comonomer is not added. Then the number of vinyl groups is determined from the polymer to be analysed as well as from the reference polymer according to the procedure 1) above. The number of vinyl groups analysed in the polymer includes vinyls that are created by the process and vinyls which are incorporated to the polymer by copolymerisation of polyunsaturated comonomer. The number of vinyl groups analysed in the reference polymer includes only the vinyl groups created by the process under the selected polymerisation conditions. Then the amount of vinyl groups originating from the polyunsaturated comonomer can be determined as:

Total number of vinyl groups in the polymer to be analysed subtracted by the total number of vinyl groups in the reference polymer.

3) Calibration Procedure for Measuring the Double Bond Content of any Unsaturated Low Molecular Weight Compound, if Present (Referred Below as Compound)

The molar absorptivity for Compound (e.g. a crosslinking booster or a scorch retardant compound as exemplified in the description part) can be determined according to ASTM D3124-98 and ASTM D6248-98. At least three solutions of the Compound in $CS_2$ (carbon disulfide) are prepared. The used concentrations of the solutions are close to 0.18 mol/l. The solutions are analysed with FTIR and scanned with resolution 4 $cm^{-1}$ in a liquid cell with path length 0.1 mm. The maximum intensity of the absorbance peak that relates to the unsaturated moiety of the Compound(s) (each type of carbon-carbon double bonds present) is measured. The molar absorptivity, B, in liters/mol×mm for each solution and type of double bond is calculated using the following equation:

$$B=[(1/C \times L)] \times A$$

wherein C=concentration of each type of carbon-carbon double bond to be measured, mol/l, L=cell thickness, mm, A=maximum absorbance (peak height) of the peak of each type of carbon-carbon double bond to be measured, mol/l.

The average of the molar absorptivity, B, for each type of double bond is calculated. The average molar absorptivity, B, of each type of carbon-carbon double bond can then be used for the calculation of the concentration of double bonds in the reference polymer and the polymer samples to be analysed.

(f) Comonomer Content of Polar Comonomers

1. Polymers Containing >6 Wt. % Polar Comonomer Units

Comonomer content (wt %) was determined in a known manner based on Fourier transform infrared spectroscopy (FTIR) determination calibrated with quantitative nuclear magnetic resonance (NMR) spectroscopy. For the FTIR measurement a film of 0.5-0.7 mm thickness was prepared. After the analysis with FTIR, base lines in absorbance mode were drawn for the two peaks to be analysed. The absorbance peak for the comonomer was normalised with the absorbance peak of polyethylene (e.g. the peak height for butyl acrylate or ethylacrylate at 3450 cm-1 was divided with the peak height of polyethylene at 2020 cm-1). The NMR spectroscopy calibration procedure was undertaken in the conventional manner which is well documented in the literature. The weight-% can be converted to mol-% by calculation. It is well documented in the literature.

For the determination of the content of methylacrylate a 0.10 mm thick film sample was prepared. After the analysis the maximum absorbance for the peak for the methylacrylate at 3455 cm-1 was subtracted with the absorbance value for the base line at 2475 cm-1 (Amethylacrylate–A2475). Then the maximum absorbance peak for the polyethylene peak at 2660 cm-1 was subtracted with the absorbance value for the base line at 2475 cm-1 (A2660–A2475). The ratio between (Amethylacrylate–A2475) and (A2660–A2475) was then calculated.

2. Polymers Containing 6 Wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. For the FT-IR measurement a film of 0.05 to 0.12 mm thickness was prepared. After the analysis the maximum absorbance for the peak for the comonomer (for methylacrylate at 1164 cm-1 and butylacrylate at 1165 cm-1) was subtracted with the absorbance value for the base line at 1850 cm-1 (Acomonomer–A1850). Then the maximum absorbance peak for polyethylene peak at 2660 cm-1 was subtracted with the absorbance value for the base line at 1850 cm-1 (A2660–A1850). The ratio between (Acomonomer–A1850) and (A2660–A1850) was then calculated. The NMR spectroscopy calibration procedure was undertaken in the conventional manner which is well documented in the literature. The weight-% can be converted to mol-% by calculation. Is it well documented in the literature.

EXPERIMENTAL PART

Wet Ageing Test a) Preparation of Test Samples and Test Results:

As non-polar carrier polymer LDPE: a conventional low density polyethylene (LDPE) homopolymer produced via a free radical polymerisation in high pressure tubular reactor—density: 922 kg/m$^3$; MFR (2.16 kg; 190° C.): 2.0 g/10 min).

As polar carrier polymer EBA: a conventional LDPE copolymer, poly(ethylene-co-butylacrylate) polymer (EBA) produced via a free radical polymerisation in high pressure tubular reactor and having a butylacrylate (BA) content of 17 wt %—density: 925 kg/m$^3$; MFR (2.16 kg; 190° C.): 8.0 g/10 min).

As polyolefin (A) PoA1: a commercially available low density polyethylene (LDPE) grade, LE8201, supplied by Borealis and produced via a free radical polymerisation in high pressure tubular reactor—density: 922 kg/m$^3$; MFR (2.16 kg; 190° C.): 2.0 g/10 min). The pellets of the grade contained antioxidant and peroxide Dicup (dicumyl peroxide.

As polyolefin (A) PoA2: the LDPE polymer used in PoA1 (LE8201) as the base resin without any additives.

Preparation of MBs: MB1 to MB4 were prepared by melt-mixing and extruding in a prism extruder of the water tree retardant (WTR) additives, Polyethylene glycol 20000 (PEG 20000; CAS number 25322-68-3) and polyglycerolester TS-T215 (CAS number 68953-55-9) together with a carrier polymers in amounts as given table 1.

TABLE 1

Composition of the MBs

| Masterbatch | Carrier polymer [wt %] | PEG 20000 [%] | TS-T215 [%] |
|---|---|---|---|
| MB-1 | EBA, 94 | 2.5 | 3.5 |
| MB-2 | LDPE, 94 | 2.5 | 3.5 |
| MB-3 | EBA, 90 | 4.17 | 5.83 |
| MB-4 | LDPE, 94 | 6.0 | 0 |

Preparation of Polymer Compositions of the Invention and Comparative Compositions Inventive Examples 1 to 3

Each of MB-2, MB-3 and MB-4 were dry-mixed with PoA1 in amounts (wt %) as given in table 2.

Inventive Example 4

MB-2 was dry-mixed with PoA2 in amounts (wt %) as given in table 2 and to the obtained pellet mixture 0.2 w-% antioxidant Irgastab KV10 and 2.5 w-% of the peroxide BCUP (tert.Butylcumylperoxide) were added, both in liquid form.

Comparative Example 1 the polymer composition was made using PoA1 only, i.e. no water tree retardant (WTR) additive was added.

Comparative Example 2

The WTR additives PEG 20000 (the total amount of 0.25 wt % in final composition) and TS-T215 (the total amount of 0.35 wt % in final composition) were meltmixed as such (not in MB) with PoA1 in amounts (wt %) as given in table 2. Thus, comparative example 2 has the same chemical composition as Inventive Example 1 but water tree retardant additives were added as such and not in MB.

Preparation of the test model cables: Each obtained composition was then extruded as described under d) Wet ageing test to form an insulation layer of model cable. The obtained cables were then subjected to the wet aging test as described above under d) for said test method.

Table 2: Results: AC breakdown strength after 1000 h of wet ageing of model cables with insulation layer made from example compositions Results in the below table 2 show that the addition of a MB containing water tree retardant additive(s) can significantly improve the water treeing properties giving values in the same range as materials to which the water tree retardant additives have been added without MB.

TABLE 2

|  | Insulating composition Polyolefin (A) and MB (Wt %) | Carrier-polymer in MB [%] | PEG 20000 in MB/final product (%) | TS-T215 in MB/final product (%) | AC breakdown strength [kV/mm] |
|---|---|---|---|---|---|
| Comp. Ex 1. | PoA1 100% | — | — | — | 41.1 |
| Comp. Ex 2 | PoA1 + WTRs as such, no MB | — | —/0.25 | —/0.35 | 60.0 |
| Inv. Ex. 1 | PoA1 90% + MB-2 10% | LDPE, 94 | 2.5/0.25 | 3.5/0.35 | 78.8 |
| Inv. Ex. 2 | PoA1 94% + MB-3 6% | EBA, 90 | 4.17/0.25 | 5.83/0.35 | 52.6 |
| Inv. Ex. 3 | PoA1 91.7% + MB-4 8.3% | LDPE, 94 | 6.0/0.5 | 0/0 | 86.2 |
| Inv. Ex. 4 | PoA2 87.3% + MB-2 10% | LDPE, 94 | 2.5/0.25 | 3.5/0.35 | 55.0 |

The invention claimed is:

1. A process for producing a polymer composition comprising the steps of
   a) providing a masterbatch (MB) which comprises at least one water tree retardant (WTR) additive and a carrier polymer, and
   b) blending the masterbatch obtained from step a) with at least one LDPE polymer (A) produced in a high pressure process, to obtain said polymer composition;
   wherein the carrier polymer and the LDPE polymer (A) are different, and
   wherein the masterbatch (MB) comprises:
   one or more WTR additive(s), wherein the total amount of the one or more WTR additive(s) is of less than 50 wt %, based on the total amount (wt %) of the MB and
   a carrier polymer in an amount of at least 50 wt % based on the total amount of the MB wherein the carrier polymer is a polar polyethylene.

2. The process according to claim 1 wherein step a) comprises providing a MB having one or more WTR additive(s), wherein the total amount of one or more WTR additive(s) is of more than 0.5 wt % based on the total amount of the MB, and a carrier polymer in an amount of at least 50 wt % based on the total amount of the MB.

3. The process according to claim 1 wherein step b) comprises blending up to 20 wt % of the MB of step a), based on the total amount of the polymer composition, to the LDPE (A).

4. The process according to claim 1, wherein:
   step a) comprises providing the MB by incorporating the one or more WTR additive(s) to the carrier polymer by meltmixing the one or more WTR additive(s) with the carrier polymer at an elevated temperature above the melting or softening temperature of at least the carrier polymer, and
   step b) comprises blending the obtained MB of step (a) with the LDPE (A).

5. The process according to claim 1, wherein the one or more WTR additive(s) comprise at least one ether and/or ester group containing compound selected from the group comprising:
1) a polyethylene glycol(s),
2) a glycerol ester compound(s),
3) a polypropylene glycol(s),
4) an amido group containing fatty acid ester(s),
5) an ethoxylated and/or propoxylated pentaerythritol(s),
6) an alpha-tocopherol ester(s),
7) an ethoxylated and/or propoxylated fatty acid(s), including any derivatives of the compounds of groups 1)-7), or from any mixture(s) of WTR additive(s) of the group(s) of 1)-7).

6. The process according to claim 1, wherein the MB contains one or more WTR additive(s) selected from the group consisting of:
1) polyethylene glycol(s),
2) glycerol ester(s) and
a combination of 1) polyethylene glycol(s) and 2) glycerol ester(s).

7. The process according to claim 5, wherein 1) the polyethylene glycol(s), if present, have a formula $HO(CH_2CH_2O)_x H$, and wherein 2) the glycerol ester(s), if present, are obtained by esterification of glycerol or a polyglycerol with at least one carboxylic acid.

8. The process according to claim 1, wherein:
a) the MB of step a)
   comprises
      one or more WTR additive(s), wherein the total amount of the one or more WTR additive(s) is of less than 50 wt % based on the total amount (wt %) of the MB, and wherein at least one WTR additive (s) is an organic compound containing at least one ether and/or ester group, and
      a carrier polymer in an amount of at least 50 wt % based on the total amount of the MB B), and wherein the carrier polymer is a polar polyethylene.

9. The process according to claim 8, wherein
the polar polyethylene contains a polar comonomer(s) which contains hydroxyl group(s), alkoxy group(s), carbonyl group(s), carboxyl group(s), ether group(s) or ester group(s), or any mixture thereof.

10. A process for producing a cable comprising a conductor surrounded by one or more layers, wherein the process comprises:
(I) producing a polymer composition according to the process of claim 1;
and
(II) applying the polymer composition of step (I) on the conductor for forming at least one layer of said at least one or more layers.

11. The process of claim 10 for producing a cable, wherein:
step (I) comprises:
   a) providing the MB in the form of pellets,
   b) blending the pellets of MB obtained from step a), optionally together with further component(s), to the LDPE (A) by meltmixing to obtain said polymer composition, and
step (II) comprises applying the obtained melt mixture of the polymer composition of step b) on the conductor to form the at least one layer.

12. The process of claim 10, wherein the cable produced is a power cable, comprising at least an inner semiconductive layer, an insulation layer and an outer semiconductive layer in the given order, and wherein the at least one layer formed in step (II) is the insulation layer.

13. The process according to claim 4, further comprising pelletizing the MB obtained in step (a).

14. The process according to claim 10, further comprising crosslinking the layer formed in step (II) in the presence of a crosslinking agent.

15. The process according to claim 11, further comprising crosslinking the layer formed in step (II) in the presence of a crosslinking agent.

16. The process according to claim 12, further comprising crosslinking the layer formed in step (II) in the presence of a crosslinking agent.

* * * * *

UNITED STATES PATENT AND TRADEMARK OFFICE
CERTIFICATE OF CORRECTION

PATENT NO.       : 8,722,763 B2                                                                                Page 1 of 1
APPLICATION NO. : 13/141672
DATED            : May 13, 2014
INVENTOR(S)      : Smedberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 213 days.

Signed and Sealed this

Twenty-ninth Day of September, 2015

Michelle K. Lee
*Director of the United States Patent and Trademark Office*